United States Patent Office 2,849,314
Patented Aug. 26, 1958

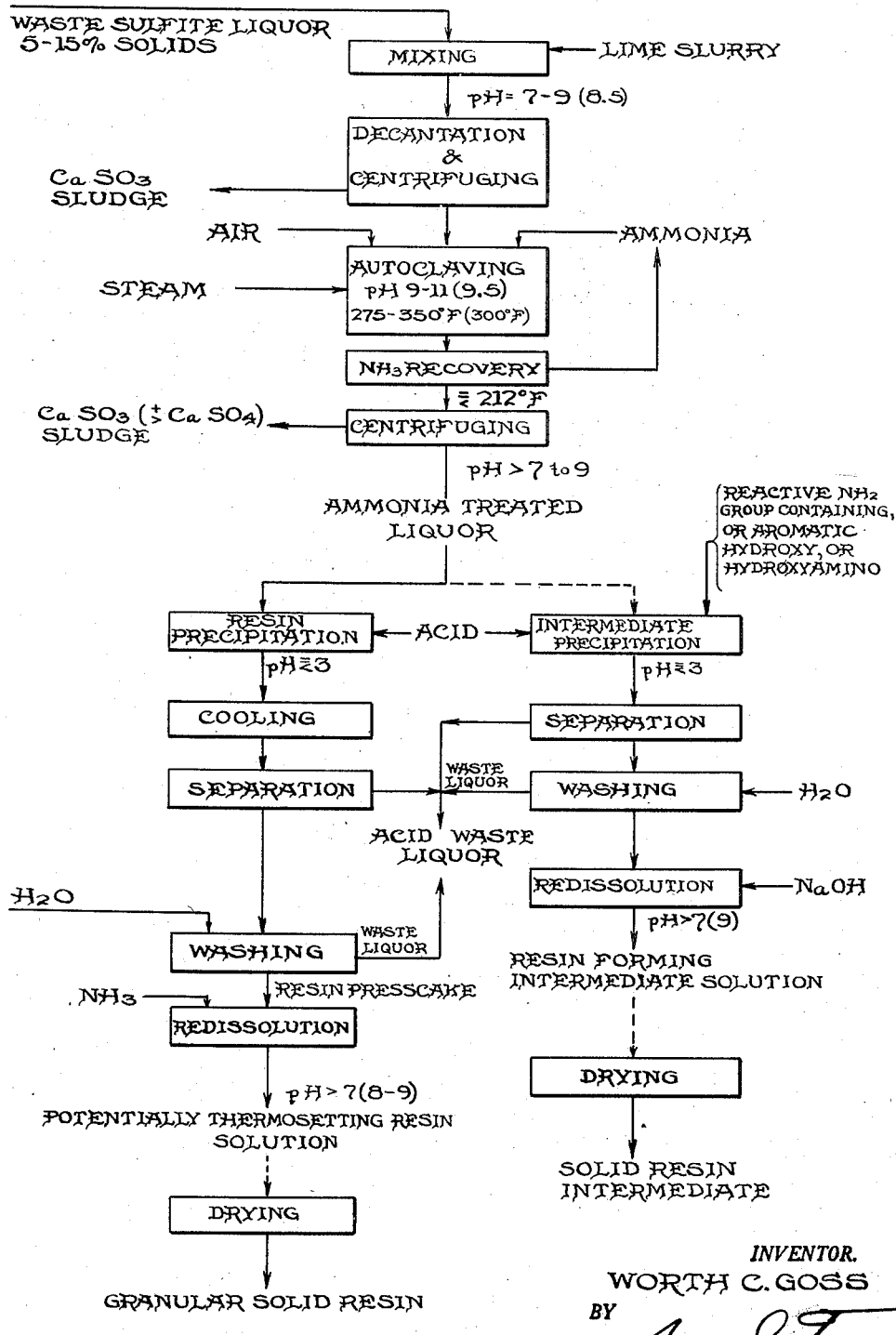

2,849,314

PROCESS OF TREATMENT AND PRODUCTS FROM WASTE SULFITE LIQUORS

Worth C. Goss, Kirkland, Wash., assignor, by mesne assignments, to Permanente Cement Company, Oakland, Calif., a corporation of California Application March 2, 1953, Serial No. 339,831

10 Claims. (Cl. 92—3)

This invention relates to new and useful resinous products and resin-forming intermediates, such resinous products being particularly useful as impregnating agents, binders and adhesives of the thermosetting type, and to the processes for production thereof. The invention further relates to improved cellulosic materials containing such resinous products and methods for production thereof.

More particularly, the invention is directed to potentially thermosetting resins and stable thermosetting resin-forming intermediates obtainable from lignin sulfonate-containing materials, such as waste sulfite liquors of the pulp industry, and to a process of treating such waste pulp liquors for production thereof. The invention is further specifically directed to improve cellulosic products, such as paper, having such resins formed and/or incorporated therein, and other improved cellulosic or woody fibrous products, such as softboard, synthetic lumber, sheetwood and the like, containing such resins as impregnating agents, binders or adhesives, and processes for the production thereof.

This application is a continuation-in-part of my copending application S. N. 249,207, filed October 1, 1951.

Waste sulfite liquor is a liquor resulting from the pressure digestion of wood and similar vegetable materials with bisulfites and sulfurous acid to produce cellulose pulp. The sulfite process utilized in paper pulp making generally results in a recovery of about 50% of the raw wood input in the form of cellulose pulp, while the remaining 50% solids content of the raw material feed is contained in solution in the waste sulfite liquor effluent from the pulp digesters. During digestion of the pulp in this sulfite process, the lignin of the lignocellulose of the wood is extracted in lignosulfonate form, and as such generally constitutes about 50% of the total solids content of the dilute waste sulfite liquor. The liquor also contains varying amounts of a complex mixture of wood sugars, for example, xylose, glucose, fructose, etc., some of which are sulfonated, and probably in various stages of hydroylsis. In adidtion, the liquor contains large quantities up to 20 to 25% of the dissolved solids content of inorganic bisulfites and free sulfurous acid, the latter imparting a normal pH of about 1.5 to 3 to the liquor. When a calcium base pulp digestion liquor is employed, the inorganic bisulfite is of course calcium bisulfite. However, in some instances the inorganic cation base may be magnesium, alkali metal or ammonia.

The enormous quantities of waste sulfite pulp liquor produced by the paper industry, its acidic and oxidizable nature both in regard to the inorganic and organic content has long been a source of an industrial waste stream pollution problem. Disposal of the waste liquor into natural bodies of water has resulted in the killing of innumerable fish unless extreme disposal measures such as substantially impractical dilution, are adopted. In some instances pulp manufacturers have been faced with the necessity of costly evaporation of the highly diluted waste liquor with subsequent burning of the solids content.

Pollution control measures have stimulated efforts to develop processes for the recovery of useful products from waste sulfite liquors, while at the same time rendering the liquors innocuous to marine life and therefore readily disposable without resulting stream pollution. Various processes have been suggested for the production of products such as dispersing agents, vanillin, tanning agents of the catechol type, and other lignin degradation of lignin derivative products, including resins. However, in regard to resinous products derived from waste sulfite liquors, the complexity of the liquor has generally prevented the recovery of products having the desired properties necessary for the intended commercial applications, or has required such extensive treatment of the liquor in order to isolate an effective resin base that the resulting product is not commercially competitive with synthetic resins such as the phenol-aldehyde, urea-aldehyde and other types. For example, where the raw liquor, with or without previous concentration or neutralization is treated with various condensing agents such as phenols, or amides with aldehydes, the many organic and inorganic constituents of the liquor seem to enter into or affect the condensation reactions to prevent formation or recovery of useful resins without excessive amounts of such additions. Thus, the resins become essentially phenol-aldehyde or amine-aldehyde resins merely diluted with sulfite liquor solids. On the other hand, where the lignosulfonate content of the waste sulfite liquor is first isolated from the other solid constituents of the liquor, and condensing agents of the above-mentioned type are then utilized, it has again been found necessary to add relatively large quantities of these synthetic resin-forming materials based on the ligninsulfonate in order to produce resins which are sufficiently active to be thermoset under the conditions required in most commercial applications. In other instances, processes have been proposed, wherein the isolated lignosulfonate constituents of the liquor are subjected to such conditions of processing, for example, strong alkali pressure cooking, that resinification apparently occurs with the production of thermoplastic substances generally not suitable for use as impregnating agents or binders. Accordingly, in spite of the many processes proposed for obtaining resinous compositions from sulfite liquor, it may be stated that for the most part such products have found little or no commercial application, as thermosetting impregnating agents, binders or adhesives and particularly in the field of production of improved cellulosic and other fibrous materials, wherein the resin impregnated material is subjected to subsequent treatment for thermosetting the resin in situ in the material to a substantially insolube, infusible product.

Moreover, for the production of useful thermosetting resins and thermosetting resin-forming intermediates from waste sulfite liquor, which are competitive by reason of lower cost and equal or superior performance with the synthetics such as phenol-formaldehyde, urea-formaldehyde, and the like, it is imperative that such products be characterized as constituted substantially entirely from the resin-forming solids content of the waste sulfite liquor, primarily the lignosulfonate compounds and degradation products thereof, or wherein these constituents constitute at least the major portion of the resin or resin-forming intermediate. As far as is known, none of the commercially economical processes heretofore proposed are productive of highly useful resins and resin-forming intermediates of the thermosetting type, which may advantageously be employed as impregnating agents, binders and adhesives, particularly in the upgrading of cellulosic and other fibrous materials, and which possess the foregoing characteristics enabling them to be produced at substantially lower costs than synthetic resins of the phenol-aldehyde and urea-aldehyde types, while exhibiting performances in such end uses which are at least comparable and in some instances superior to these more expensive synthetics.

OBJECTS

It is, therefore, a primary purpose and object of the invention to provide thermosetting resinous products and thermosetting resin-forming intermediates derived from waste sulfite liquors, which resins are highly reactive and thermoset to the infusible and insoluble state under the conditions required for a wide variety of commercial applications. These resins and resin-forming intermediates are comprised at least in major part of the resin-forming organic solids of such waste sulfite liquors, and in particular the lignosulfonate and lignosulfonate degradation products, as modified by the process of the invention.

It is a further primary purpose and object of the invention to provide a new and economical process for the treatment of waste sulfite liquors whereby thermosetting resins and thermosetting resin-forming intermediates, as above mentioned, may be produced, while at the same time producing a residual process liquor having a biochemical oxygen demand substantially less than that of the raw waste sulfite liquor, thereby eliminating the industrial waste disposal problem which has faced the pulp industry since the adoption of the sulfite pulp process. It is an advantage of the preferred process of the invention for the treatment of waste sulfite liquors that it permits recovery of highly reactive thermosetting resinous products and thermosetting resin-forming intermediates, characterized as set forth above, without the necessity of isolating the lignosulfonate constituents of the liquor. At the same time, the adverse effects of the inorganic constituents and other organic constituents, such as sugars, of the waste liquor on the production of commercially useful resinous products, and the formation of undesired thermoplastic substances by resinification, are avoided.

Another object of the invention is to recover from waste sulfite liquor valuable self-condensable potentially thermosetting resins, and stable resin-forming intermediates capable of thermosetting with aldehydes, which products are characterized by a substantial nitrogen content in that portion derived from the resin-forming solids of the waste sulfite liquor treated in accordance with the process hereindisclosed.

A further object is to provide potentially thermosetting resins and thermosetting resin-forming intermediates condensable with aldehydes which are particularly useful as impregnating agents, binders and adhesives.

Other principal objects are to provide improved cellulosic products having the aforementioned resins formed or incorporated therein, and the provision of processes for the fabrication of such products. A specific object is the production of paper of improved dry and/or wet strength by incorporation of the resins of the invention having cationic properties. Another specific object is to provide improved pressed and unpressed board, synthetic lumber, sheetwood and the like of increased strength and water resistance by incorporation of the resins of the invention.

Still another specific object of the invention is to provide a relatively simple and economical process for the treatment of waste sulfite liquor to render the same substantially innocuous, and to produce from the liquor, reactive nitrogen-containing compositions, some of which may be utilized in their own right as potentially thermosetting resins, and all of which may be condensed with reactive aldehydes to form potentially thermosetting resins having lower curing temperatures and times. In addition, these compositions embrace those to which a relatively small (minor) amount of a wide variety of extraneous aldehyde reactive substances may be added for the production of more stable resin-forming intermediates (or primary resinous products) exhibiting enhanced condensation reactivity with aldehydes to form potentially thermosetting resins having differing characteristics particularly useful for certain selective applications.

A further important and specific object of the invention is the production from waste sulfite liquors of relatively inexpensive potentially thermosetting resins, and intermediates capable of condensing with aldehydes to form potentially thermosetting resins, particularly suitable for application to cellulosic fibrous material, such as beater stage addition to paper stock, which resins are composed at least in major part of reaction products derived from the lignosulfonate and lignosulfonate derivatives of the treated sulfite liquor, with or without modification by addition of relatively small amounts of aldehyde reactive or condensable substances, such as the amide, aromatic hydroxy, amino, and hydroxyamino types.

Other objects and advantages of the invention will become apparent from the following detailed description thereof.

DESCRIPTION OF INVENTION

According to the present invention, it has been discovered that reactive nitrogen-containing compositions all of which are capable of condensation with aldehydes to form useful and valuable potentially thermosetting resins, and some of which are self-condensing as potentially thermosetting resins, may be derived from waste sulfite liquor by heating the liquor with ammonia, and acidifying the ammonia treated liquor to precipitate reactive resin-forming compositions having a substantial nitrogen content.

The process is outlined below in regard to a preferred procedure when applied to raw acid waste sulfite liquor effluent from paper pulp digesters employing sulfurous acid and calcium bisulfite as the digest liquor:

Step I

Adjusting the pH of the liquor to substantially neutral or slightly alkaline, for example, 7 to 9, preferably by treatment with lime to effectively remove the inorganic portion of the total sulfur content of the liquor solids as calcium sulfite. Alternatively, the raw waste sulfite liquor may be subjected to steam stripping at atmospheric, reduced, or elevated pressures to merely remove the free sulfurous acid as sulfur dioxide, in which case only a portion of the inorganic sulfur content is removed and the pH of the liquor is raised to a value not exceeding about 4.5.

Step II

Subjecting the clarified liquor from which the precipitated calcium sulfite has been removed (or the $SO_2$ steam stripped liquor) to heating under pressure with addition of ammonia to a pH of from about 8.5 to 11, preferably under oxidizing conditions. The temperature of this ammonia treatment step with or without oxidizing conditions is generally maintained at from about 275 to about 350° F. under partially autogenous pressure with addition of steam when required. An advantage in this step of the process is that the reactions occurring are apparently exothermic, and accordingly minimum steam consumption is required in order to maintain the temperature at the desired level.

In general the oxidizing conditions which are preferred are maintained merely by the passage of an oxidizing gas, such as air or oxygen, or other oxygen containing gas through the liquor under treatment.

Step III

Acidifying the clarified liquor resulting from heating in the presence of ammonia to precipitate potentially thermosetting self-condensing resins, or by addition of relatively small amounts of reactive substances capable of condensing with aldehydes prior to or at the time of acid precipitation to recover stable thermosetting resin-forming intermediates having an enhanced reactivity with respect to aldehydic condensation agents for the formation of potentially thermosetting resins of the resole type, or the formation of permanently fusible and soluble condensation products of the novolak type.

PRODUCTS

One of the principal advantages or features of the invention resides in the fact that products which are highly useful as potentially thermosetting resinous binders, impregnating agents or adhesives may be obtained solely from the characteristic organic solids of the waste sulfite liquor, when the liquor is treated by the process set forth above. Such products, which are self-condensable, may be modified by addition of aldehyde type condensing agents for increasing the condensation reactivity and lowering the thermosetting temperature. Precipitates may be recovered exhibiting varying degrees of self-condensation and thermosetting properties by a slight variation in the acid precipitation procedure without any modification of the overall process. The lignosulfonate and lignosulfonate degradation or derivative products believed to constitute the major portion of the potentially thermosetting resins are modified primarily by the ammonia-oxidation treatment, as shown by analyses, which indicate a substantial nitrogen content in the recovered resins.

With only a slight departure from the process as generally outlined above, stable thermosetting resin-forming intermediates and condensation products of the novolak type may be obtained from the waste sulfite liquor, by addition of relatively small amounts of reactive or condensable substances of the amide, aromatic hydroxy, amino, and hydroxyamino types. Where such substances are added prior to acid precipitation, that is, to the clarified effluent from the ammonia treatment of the liquor, or at the time of acid precipitation, stable thermosetting resin-forming substances are recovered from which potentially thermosetting resins may be formed by subsequent reaction with condensing agents of the aldehyde type. On the other hand, where such reactive substances are added to the precipitated sludge after acidification of the liquor effluent from the ammonia treatment, an aldehyde condensing agent is generally also added to effect condensation in the acid medium and in such proportion that a permanently fusible, soluble resin of the novolak type is produced.

By proper selection of the added reactive substance, the potentially thermosetting resins subsequently obtained may be made to exhibit properties which render them particularly useful for certain applications. For example, where amino group containing compounds are added to the clarified effluent liquor from the ammonia treatment, the resins ultimately obtained exhibit excellent cationic activity, and as such, are particularly adapted for fixing on cellulosic fibers, such as paper to increase the dry and/or wet strength thereof, particularly the former. On the other hand, when the reactive substance added is an aromatic hydroxy compound (or amino hydroxy compound) containing at least one, and preferably at least two reactive hydrogens in the aromatic ring, the resulting stable resin-forming intermediate of enhanced condensation activity is substantially more soluble in aqueous solutions of definitely acid pH. Consequently, such products may be dissolved in aqueous solutions of acid pH, for example 3 to 4, and condensed with formaldehyde to form potentially thermosetting resins exhibiting properties of a quicksetting glue and particularly useful as an adhesive or binder in bonding sheets, for example, in the manufacture of plywood and veneering furniture, and otherwise as a joining glue.

The invention is described in more specific detail below, including the nature of the raw material, and the successive steps of the liquor treatment process, which latter are described with reference to the flowsheets of the accompanying drawings, it being understood that the invention is not to be deemed limited thereto.

RAW MATERIAL

The effluent liquor from the paper pulp digester is a dark amber colored acid solution of a pH varying from as low as about 1 up to about 3, the inorganic content of which consists primarily of calcium bisulfite and excess sulfurous acid ($SO_2$), the latter imparting to the liquor its pungent odor. The organic material of the liquor mainly comprises the soluble lignin sulfonate constituents of the lignocellulose of the digested wood pulp and soluble wood sugars, which latter may be in various stages of sulfonation and hydrolysis. It is, of course, to be recognized that the high molecular weight lignin of the wood extracted in the pulp digestion process does not remain intact since various degradation products of the lignin are without doubt formed during pulp digestion. Although it is not intended to limit the invention to any theory or mechanism, it is clearly recognized that the lignin or lignin degradation products of the waste sulfite liquor contain organically bound sulfur, probably both in the nature of firmly bound sulfonic acid groups and loosely held bisulfite addition products of carbonyl group-containing substances, in particular aldehyde groups. In addition to the functional groups above-mentioned, there is substantial evidence that the lignin sulfonate or lignin sulfonate degradation products of the liquor also contain hydroxyl groups, both aromatic and aliphatic, and the well-recognized methoxyl groups. It is believed, the resin-forming propensity of the liquor solids may be in part ascribed to phenolic hydroxy and aldehyde groups, the former giving rise to active hydrogen linkages ortho or para to the OH group or groups. All of these groups are associated in as yet undetermined structural relationship in a lignin building stone or unit, which is believed to be composed of a phenylpropane derivative.

PROCESS

Inorganic sulfur removal.—Step I

Referring to the flowsheet of Figure 1, lime is mixed with waste sulfite liquor of low solids content (5 to 20%), preferably as milk of lime or a high solids lime putty. The lime addition is made in amount sufficient to adjust the pH of the liquor to from about 7 to 9 (preferably about 8.5). Heating of the mixture up to near the boiling point, e. g. 210° F., may be employed. This results in the precipitation of substantially all or most of the inorganically combined sulfur as insoluble calcium sulfite formed by the reaction of the calcium bisulfite and the sulfurous acid ($SO_2$) in the liquor with the added lime. It is an advantage of this preferred first step of the process that substantially all of the added lime together with that of the original liquor not organically combined, and the inorganically combined sulfur are recovered as calcium sulfite in the sludge resulting from this lime precipitation step. The treated liquor may be separated from the sludge by any suitable method, such as settling and decantation with or without subsequent filtration or centrifuging (although the latter is preferred) to obtain a high solids calcium sulfite slurry soluble in sulfurous acid. This calcium sulfite may be reutilized in the preparation of fresh pulp digestion liquor, and accordingly the production of waste material in this step of the process is effectively avoided. The clarified liquor or filtrate resulting from this lime precipitation step contains substantially all of the characteristic organic solids of the original raw liquor feed, and is utilized as the feed liquor for the succeeding ammonia treatment step in the process for recovery of the resins and resin-forming intermediates of the invention.

Ammonia treatment.—Step II

The clarified liquor is next introduced into suitable apparatus, such as autoclaves wherein the next step of the process may be conducted either continuously, semi-continuously or on a batch basis. Ammonia is added to the liquor in an amount not substantially less than about 3% by weight based on the weight of the raw sulfite liquor fed to the process. (For a 10% solids content liquor containing a normal lignosulfonate content of from about 50 to 60% by weight of the solids, ammonia is present in an amount of from about 50 to 60% by weight of the lignin or lignin derivative constituents of the liquor. The foregoing is calculated on the basis of dry anhydrous ammonia, and in the event that commercial aqueous solution of ammonia (28% $NH_3$ by weight) is utilized, equivalent amounts should be added.)

Stated otherwise, ammonia may be added to the neutralized or slightly alkaline liquor to adjust the pH of the liquor to from about 9 to 11 preferably 9.5. The ammonia containing liquor is heated under partially autogenous pressure using steam or other suitable heating means to bring the liquor up to a temperature of from about 275 to 350° F., preferably 300 to 310° F., the exothermic nature of the reactions occurring usually being sufficient to maintain the temperature with minimum heat input.

It is generally definitely preferred to conduct the ammonia treatment under oxidizing conditions by the introduction of an oxidizing gas such as air, oxygen, oxygen enriched air, or other oxygen containing gas to effectively oxidize the wood sugars to relatively innocuous substances and to otherwise produce the desired results of the autoclaving treatment. When utilizing air introduction during the ammonia treatment, the total pressure may widely vary from slightly in excess of 100 p. s. i. g. to as high as 250 p. s. i. g., although the preferred total pressure range is from about 125 to 175 p. s. i. g. Of course, the partial pressure of the autogenous steam is that required to maintain the temperature of the liquor within the above-stated range. Retention times of ½ to 2 hours are recommended, although the time may vary widely, usually inversely with temperature. 60 to 75 minutes cooking have been productive of excellent results.

The changes which are effected (in the chemistry) of the organic solids content of the liquor during the ammonia treatment are by no means understood. However, it is clear that a small portion of the ammonia enters into the reaction with the organic resin-forming solids of the liquor, since analyses of the potentially thermosetting resins recovered upon subsequent acid precipitation indicate a nitrogen content in the products upwards of 3% to about 5% by weight. The resin intermediates have a comparable or higher nitrogen content, depending on the modifying substance used. It is known that normal waste sulfite liquor from the pulp digestion process has no significant nitrogen content. In this connection, it should be noted that the organic solids of the liquor apparently are not sensitive to larger or even excessive amounts of ammonia during the treatment, since up to 10 times the amount above-stated, namely as high as 30% anhydrous ammonia may be employed based upon the weight of the raw liquor feed to the process. However, such amounts are not productive of enhanced results, and are uneconomical.

Although it is not intended to limit the invention to any theory, it is believed that maintenance of the oxidizing conditions during the ammonia treatment effectively transforms the wood sugars into relatively innocuous substances, as well as any other inorganic or organic constituents of the liquor which remain soluble upon acid precipitation of the resin or resin-forming products. Actual tests indicate that the biological oxygen demand (BOD) of the residual liquor of the process is reduced up to 80% thereby eliminating the stream pollution problem and permitting disposal of the residual process liquor in natural bodies of water, preferably after neutralization. This may be accomplished advantageously by percolation of the liquor through a limestone bed. This liquor decontamination by reduction of BOD is one of the most important advantages of the invention.

The ammonia treated liquor is suitably discharged through a pressure reduction system, such as flash tanks, for partial recovery of the ammonia. The effluent liquor from the flash tanks may advantageously be passed to a stripping tower for a more complete recovery of the ammonia with the exception of that portion which has chemically combined with the organic solids of the waste sulfite liquor. This is a distinct advantage of the process of the invention in that the treating substance, namely ammonia is substantially completely recoverable for re-use in the ammonia autoclaving step. Alternatively, the liquor effluent from the ammonia treatment may be passed directly through a suitable stripping tower, usually operating on a reflux principle, without first being passed through flash tanks. In either of the foregoing procedures, the temperature of the liquor is reduced to the atmospheric boiling point or below. It is to be understood that ammonia recovery is dictated by economy and is not a critical step of the resin producing process.

As a rule, the liquor effluent from the ammonia treatment has a pH of from just over 7 to about 9 and contains appreciable quantities of a sludge which consists primarily of calcium sulfite, and in some instances some small amounts of associated calcium sulfate, which sludge is separated from the liquor by any suitable means, such as filtration, centrifuging and the like.

AMMONIA TREATED LIQUOR

The clarified liquor effluent from the preceding ammonia treatment constitutes the starting point for the recovery of various highly useful and different products, described in detail hereinbelow.

This liquor may be described as containing the characteristic solids of waste sulfite liquor, including the acid precipitatable and acid soluble components, modified to the extent of the changes effected by the preceding treatment of steps I and II, which broadly defined, comprise the following:

(1) Removal of at least a portion of the inorganically bound sulfur, and preferably substantially complete removal of inorganically combined sulfur and inorganically combined calcium.

(2) Ammonia treatment (under oxidizing conditions unless wood sugars previously removed) with resultant introduction of a substantial nitrogen content into the acid precipitatable resin-forming solids of the liquor. It is believed that such solids are composed mainly of ammonia (nitrogen) modified lignosulfonates, lower molecular weight lignosulfonate degradation products, and products of reaction between such liquor components, all in complex mixture. The acid soluble components of the clarified liquor are believed to be composed at least in part of the various oxidiation or degradation products formed from the wood sugars as a result of the ammonia treatment under oxidizing conditions.

Precipitation by acidification.—Step III

The acid precipitation step of the process is generally conducted by the addition of acid, preferably a mineral acid such as sulfuric or hydrochloric, to the clarified liquor effluent from the ammonia treatment phase. The acid is added in amount to produce a pH of 3 or less, that is, reduction of the pH of the liquor to not exceeding 3, whereby the resin or resin-forming intermediate is precipitated.

It has been found advantageous to maintain or heat the acidified liquor containing the precipitate at elevated temperatures up to the boiling point, since this procedure coagulates and densifies the precipitate facilitating separation from the acid mother liquor. Also it appears to enhance the condensation reactivity and thermosetting properties of the products, particularly in regard to the self-condensable potentially thermosetting resins produced.

The precipitate-containing liquor is then usually cooled (or subsequently cooled upon washing), and the considerably coagulated or densified precipitate in some cases advantageously permits a primary decantation of the acid waste liquor, although any suitable separatory means for recovery of the solid precipitate, preferably centrifuging or filtration may be utilized. The filter cake or centrifuge underflow slurry is then subjected to washing to remove free acid from the precipitate. At this point, it is usually advantageous to redissolve the precipitate in water or slightly alkaline solution, for example an aqueous medium made alkaline to pH 7 to 8 with ammonia or to a pH as high as 10 with an alkali, such as sodium hydroxide, to form a stable resin or stable resin-forming intermediate solution, which may be used as is. Alternatively, the solution may be subjected to drying in any suitable manner, for example, drum, spray, vacuum, or tray drying to produce a granular or powdered solid. Control of drying temperature or time should be exercised to prevent setting of the self-condensable resins. Should the recovered precipitate be associated with any appreciable amounts of inorganic ash, such as calcium sulfate in the event sulfuric acid is used as the precipitating acid, the solution may be subjected to appropriate clarification, as by filtration, prior to drying.

SELF-CONDENSABLE POTENTIALLY THERMO-SETTING RESINS

Products of this type are recovered from the clarified liquor from the ammonia treatment by acidification according to the procedure outlined above to a pH of not exceeding 3, and preferably at least 2 or below, without the addition of any extraneous organic substance capable of condensing with aldehyde bodies. The resinous products thus produced, may vary within certain limits in regard to their condensation activity and thermosetting properties, depending primarily upon the degree of acidification of the liquor, and retention time of the precipitate in the liquor.

These self-condensable thermosetting resins are believed to be characterized by their phenol-aldehyde type of condensation activity and thermosetting properties (and possibly a sulfonamide-aldehyde condensation activity by reason of modification in the ammonia treatment). In most instances, they exhibit wet plastic flow or fusion points of approximately 90 to about 100° C., while the more active type of such resins does not appear to exhibit any appreciable wet flow or fusion property at such temperatures. Being substantially wholly self-condensable, these resins do not exhibit any dry fusion point, but rather set to an infusible insoluble mass upon the application of heat within ranges varying from as low as 150° C. (the more active resin) up to 200° C. or slightly higher (less active resin) for times varying from as low as one-half hour to from 3 to 4 hours, respectively. These self-condensable resins are generally characterized by insolubility in most acids, including sulfurous acid, and are soluble in substantially neutral, slightly alkaline or highly alkaline solutions, for example, ammoniacal and caustic alkali solutions.

These self-condensable potentially thermosetting resins as recovered by acid precipitation in the manner above indicated, are believed to exist in a stage of condensation equivalent to that of a phenol-aldehyde resin in the A (phenol alcohol) stage or the advanced A stage of such resins wherein some B stage condensation products or polymerization products of the diphenylmethane derivative type exist.

EXAMPLE 1.—S-RESIN

A resin of this arbitrarily designated type, relatively less active, was prepared from the clarified autoclave effluent liquor by acidification to a pH of 1.7 with hydrochloric acid and heating of the liquor to from 80 to 100° C. followed by primary decantation, with subsequent filtration and washing with water until the wash water showed a pH of 6. The resin cake was dried at 105° C. and as recovered analyzed 4.46% nitrogen (calculated as N), 3.86% sulfur (calculated as S) and only 0.17% calcium (calculated as Ca). The filter cake of resin was redissolved in an ammoniacal solution having a pH of about 7 to 7.3, which solution was then subjected to spray drying under vacuum operated at a temperature of from 212 to 300° F. (100–150° C.), the dried resin being recovered in fine granular form.

This resin, precipitated at a pH of 1.7, was relatively insensitive to the retention time in the acid mother liquor. It is thermosetting without the addition of any aldehyde body at a temperature of from 400 to 410° F. (200–210° C.). However, its primary usefulness as an impregnating binder in softboard and in sheetwood, a synthetic lumber having a density intermediate that of softboard and hardboard, is realized when it is further condensed with small amounts of formaldehyde, for example, 3 to 5% by weight of the sulfite liquor resin. Under these conditions the resin sets and develops full strength at temperatures as low as 300 to 330° F. when heated for about 2 hours.

This S-resin is primarily intended as a strengthening and waterproofing agent for softboards. Its characteristics of solubility and heat setting in an alkaline medium in the presence of urea render it particularly desirable for this use. Although there is some question as to the mechanism of the resin setting in the presence of urea and ammonia, it is believed that an inter-action of the ammonia neutralized sulfonic groups takes place when urea is present, giving a much stronger board than occurs when the urea is absent. It is believed that the urea inter-acts with the ammonia neutralized sulfonic groups to give a sulphur nitrogen carbon bond, but in any event the presence of urea when the S-resin is used in a softboard greatly enhances the quality of the finished product. In similar manner, ammonia and urea are helpful when any acid group resin is employed as, for example, sulfonic groups or carboxyl groups. Thus, ammonia and urea will aid in the set of any of the resins herein described, particularly when used in boards. Amide substances other than a urea may be incorporated in the softboard in the same manner, for example, formamide or dicyandiamide. When the S-resin is employed with ammonia and urea for impregnation of a softboard, the procedure is as follows:

The S-resin is dissolved in water containing ammonia and an amount of urea about equal to 20% of the resin is added. Also, about 5% of the weight of the resin of formaldehyde is added. A softboard or softboard blank is flooded with the solution and it is sucked therethru and excess squeezed from the board. I prefer to put about 14% of resin into the softboard, plus one-fifth as much urea. This increases the weight of the softboard by about 17%. It will ordinarily more than double the strength after a three-hour baking at 320° F., and it ordinarily increases the wet strength at least fivefold. It will be noted that the ratio of formaldehyde to urea is totally inadequate for resin formation. In fact, if a softboard is impregnated with urea, ammonia and the formaldehyde specified, and the resin left out, the strength of the softboard does not increase at all. It is therefore believed that some not wholly understood reaction or inter-reaction of the S-resin, ammonia and urea occurs to give the excellent strength and water resistance which results from use of the S-resin under conditions of the above example.

EXAMPLE 2.—B-RESINS

A more active resin in regard to self-condensation and thermosetting properties may be prepared from the clarified liquor by reducing the pH to 1 or below, but requires close control in regard to retention of the precipitate in the heated acidified liquor in order to avoid premature setting of the resin, since there is a tendency for it to proceed rapidly from the A through the B to the C stage.

Clarified liquor from the ammonia treatment was acidified to a pH of 0.9 to 1 by the addition of the calculated amount of sulfuric acid of commercial grade whereupon resin precipitation immediately occurred. The precipitate containing liquor was rapidly fed through a heating coil and brought to a temperature of 90 to 100° C., while limiting the time at temperature not to exceed about 1 minute, after which the liquor was rapidly chilled to room temperature. The chilled resin slurry was then centrifuged to remove acid mother liquor and passed to a filter upon which it was washed free of residual acid. Its nitrogen, sulfur and calcium analysis was very similar to that given above for the S-resin. The filter cake of resin was neutralized with sufficient amount of ammoniacal solution having a pH of about 7.3 to redissolve the resin precipitate. This relatively stable alkaline resin solution is suitable for direct use as a thermosetting impregnating resin binder, and may be shipped in sealed containers. Alternatively, the solution may be carefully dried, for example, in vacuo at relatively low temperatures to produce a solid powdered resin. The granular resin is readily soluble in slightly alkaline solutions at the point of use, or may be suitably dispersed in solutions which are substantially neutral.

The B-resin, as above prepared, is apparently similar to a phenol aldehyde resin which has reached the advanced A, or perhaps partial B stage, but it is still soluble in alkaline solutions probably due to the sulfonic group content. The resin partially thermosets without addition of any other condensing agent, such as formaldehyde, at temperatures as low as 100° C., and may be fully thermoset to an infusible insoluble state by heating to temperatures of about 150° C. for only about one-half hour, particularly in the presence of a catalyst of acid pH. The B-resin is particularly useful in paper manufacture (as by addition to beater stage pulp) for increasing water resistance, and dry and wet strength of such cellulosic products, as will be noted in further detail below.

The self condensable resins of the S and B type, as above exemplified, are recovered in excellent yield. Based on the total weight of the raw waste sulfite liquor fed to the process, about 3 to 5% resin solids are recovered, varying more or less with the percent solids content of the liquor feed. A typical example under the conditions of S-resin recovery, as described in Example I above, is a yield of 3.58% based on the total weight of the liquor feed of 12% solids content. The liquor having a lignin solids content of from about 50 to 60%, the yield of resin based on the lignin solids is approximately 50 to 60%.

STABLE RESIN-FORMING INTERMEDIATES

One of the most important features of the invention is the discovery that modification of the ammonia treated waste sulfite liquor effluent from the autoclave with small (minor) amounts of certain substances capable of condensing with aldehyde bodies leads to the recovery of stable thermosetting resin-forming intermediates (or stable primary resinous substances) upon acid precipitation. These products, as described in detail below, have the advantage over the self-condensable resinous products, above described, in that they do not require such a close control in acid precipitation for optimum activation, while at the same time they do not exhibit a tendency (such as the B-resin) to prematurely set under the acid precipitating conditions.

These acid precipitated products are characterized as capable of reaction with aldehyde bodies in acid or alkaline media to form condensation products similar to the resoles of the synthetic phenol-formaldehyde type resins. The condensation products so formed upon subsequent reaction with aldehydes are advantageously characterized by relatively low curing temperatures and times, which renders such resins particularly adaptable as impregnation agents for cellulosic materials, for example, in the manufacture of paper by beater stage addition for greatly increasing the dry strength (and/or wet strength) of the paper. In addition, the modifying agent, above referred to, added to the ammonia treated liquor may be such that the resin subsequently produced advantageously exhibits an increased cationic activity, which facilitates the fixing of the resin upon cellulosic fibers by electrical attraction rather than physical absorption, for example, even at the pulp dilutions existing in the beater and chest stages of paper manufacture.

The modifying substance added to the ammonia treated liquor (autoclave effluent) may suitably be selected from among the following types of materials and resins having differing characteristics may advantageously be produced.

(1) Amino group-containing substances. Amino group-containing substances capable of condensing with aldehydes, probably through activation of one or both of the hydrogens of the amino group are particularly effective. Such substances may be of the aliphatic, aromatic, and heterocyclic type, including amino group-containing classes such as amines, amides, amidines, and aminotriazines, and the thio (sulfur-containing) counterparts of any such group of substances. Specifically, among the large number of compounds included within this grouping, the following may be mentioned as representative: urea, thiourea, biuret, guanidine, dicyandiamide, dicyandiamidine, melamine, ammeline, ammelide, and others. Also included in this category are primary aromatic amines such as aniline, phenylenediamines, naphthylamines, benzidine and homologues of aniline, such as toluidines and xylidines, mono and diamines.

(2) Aromatic hydroxy substances wherein at least one and preferably two or more active hydrogens are contained in the ring in positions ortho or para to the OH group or groups. Among such substances the following may be mentioned as representative: phenol, cresols (particularly the meta isomer), dihydric phenols, namely resorcinol, quinol, and pyrocatechol, particularly the first named; trihydric phenols, naphthols, and homologues of such substances which satisfy the requirements of ring hydrogen in ortho and/or para positions.

(3) Aromatic hydroxy amino compounds, which contain at least one, and preferably two or more active ring hydrogens in position ortho or para to one or more of the amino and/or hydroxy groups. Hydroxy amino compounds such as 5 amino meta-cresol and meta-aminophenol are particularly effective.

The above-mentioned modifying substances may be added to the ammonia treated liquor effluent from the autoclave either prior to acidification of the liquor, or at the time of acidification, preferably the former. This procedure is shown in the flowsheet at the lower right hand side thereof by the dotted line connecting the ammonia treated liquor effluent from the autoclave with the acidification step for precipitation of the resin intermediate. In some instances, a small amount of aldehyde, e. g., formaldehyde, may be added with the modifying substance subsequent to acid precipitation of the resin-forming components of the sulfite liquor, whereby primary resins comparable to novolacs are obtained upon further addition of acid. These primary resinous products may be further reacted with aldehydes, as in the case of the stable resin-forming intermediates, for the production of potentially thermosetting resins.

In general, the amount of modifying substance for stable resin intermediate (or primary resin) formation may be any minor amount based on the weight of the acid precipitatable components of the ammonia treated liquor, i. e., the acid insoluble lignosulfonate, lignosulfonate derivatives, and reaction products thereof. Stated otherwise, the amount of modifying substance added may be any minor amount based on the weight of the resin solids recovered by acid precipitation from the ammonia treated liquor when no such modifying substance is employed (S and B-resin recovery). Within this broad general range, extending from effective amounts sufficient to produce the stable resin intermediate (or novolac type primary resin) from the resin-forming waste sulfite liquor solids up to about 50%, the modifying substance may be more advantageously employed in a range of amounts from about 1% to not substantially exceeding about 10%.

In this regard, although it is not intended to limit the invention to any theory or mechanism, it is believed that the modifying substance in effect introduces into the lignin or derivative solids content of the liquor, phenolic hydrogen condensation activity or amino group hydrogen condensation activity, or both, more or less at the expense of the aldehyde (carbonyl group) condensation activity of such lignin and lignin derivative solids in the liquor. Accordingly, amounts substantially exceeding 10% are not required for production of completely satisfactory stable thermosetting resin-forming intermediates, and in addition, are more or less uneconomical, since substantial unreacted amounts of such modifying solids, which are acid soluble, would be lost in the acid waste liquor separated after acid precipitation. Preferred amounts of such modifying substances are from about 3 to 5%.

These acid precipitated resin-forming intermediates (and primary resins) upon subsequent reaction with aldehydes or aldehyde-engendering substances exhibit thermosetting characteristics which make them generally useful as thermosetting resin impregnating agents and binders, and particularly useful in certain applications depending upon the particular modifying substance employed. For example, most of those substances falling in the category designated (1) above exhibit enhanced cationic activity, and are therefore advantageously adapted to impregnation of cellulosic fibers, for example, as in beater stage addition in paper manufacture. The resins derived from the use of aromatic hydroxy substances, falling under category (2) above, are sufficiently acid soluble to enable the use of an acid catalyst at a pH as low as about 3 to 4 for the production of quick-setting glues which are particularly applicable as adhesives, for example, for plywood, veneering sheets in furniture manufacture, and otherwise for any laminated or joined materials of cellulosic or woody nature. However, the resins produced by employing such aromatic hydroxy modifying substances are also useful in impregnation of cellulosic fibers, such as paper, softboard, synthetic lumber, and other cellulosic or woody products. The resins produced utilizing aromatic hydroxyamino substances of category (3) above, are useful both as paper impregnating resins of enhanced cationic activity, and as relatively quicksetting glues, as well as the general applicability abovementioned.

The recovery of these stable resin-forming intermediates may be made by the procedure outlined in the lower righthand portion of the flowsheet, and is directly comparable with the isolation of the self-condensable type of resin from the waste sulfite liquor. Upon acid precipitation by lowering of the pH to about 3 or below, the lignin and lignin derivative solids of the ammonia treated liquor containing the added modifying substances are heated in the acid mother liquor at from about 80° C. up to the boiling point, and the precipitate is separated in any suitable manner such as by centrifuging or filtration. The precipitate is washed, and then preferably redissolved in alkaline solution, for example, ammoniacal solutions or alkali metal hydroxide solutions. The purified resin-forming intermediate is then recovered by low temperature drying, such as in vacuum or by tray drying.

The formation of potentially thermosetting resins from the resin-forming intermediates by reaction with an aldehyde may be conducted in the alkaline solution above referred to, or the dried recovered intermediate may be redissolved in alkaline solution for reaction with the aldehyde.

In the case of alkaline condensation to form the resole type of potentially thermosetting resin, the aldehyde is usually added to the alkaline solution of the resin-forming intermediate followed by heating at a reflux temperature for short periods of time. The resulting soluble resinous condensation product is preferably employed in the solution stage as an impregnating agent or binder, although a solid potentially thermosetting resin may be recovered by careful drying of the solution at relatively low temperatures (or rapid drying at higher temperatures), for example, vacuum spray drying, or tray drying. The solid resin, as recovered, exhibits sufficient solubility or dispersability in water to be used in aqueous solution or dispersion as an impregnating agent, or, more advantageously, it may be readily dissolved in alkaline solution for impregnating use.

Formaldehyde is the preferred aldehyde for condensation with these resin intermediates (or with the self-condensable resins obtained from the waste-sulfite liquor without addition of modifying substances, such as the resin of Example 1 above), because of its reactivity, cost and availability. However, any suitable reactive aldehyde of the aliphatic, aromatic or heterocyclic type may be employed, among which may be mentioned, furfural, acetaldehyde, butyraldehyde, acrolein, crotonaldehyde, benzaldehyde; and compounds yielding aldehydes such as hexamethylenetetramine.

It is a distinct advantage of the invention that only minor amounts of aldehyde are required for formation of the potentially thermosetting resins from the resin intermediates (and to reduce curing temperatures of the self-condensable resins, such as the resin of Example 1). Recommended amounts range from about 3 to 10% by weight of the resin intermediate (or resin), although larger amounts may be used with satisfactory results. Where quicksetting glues are to be produced from the aromatic hydroxy-containing intermediate, the recovered dry intermediate is usually dissolved at an acid pH of from about 3 to 6.8, using any suitable mineral acid as the condensing agent. Addition of a suitable aldehyde to this acid solution promotes rapid thermosetting, the curing times for such quicksetting glue being from about 1 to 5 minutes, at temperatures of from about 280 to 310° F.

The following are typical examples of the preparation of the resin intermediates (or primary resins) by addition of such modifying substances to the treated waste sulfite liquor, but are not intended to limit the invention to the products illustrated.

EXAMPLE 3.—THIOUREA MODIFIED INTERMEDIATE 150 gallons of waste sulfite liquor having a pH of 2, a solids content of 7.88% and a specific gravity of 1.029 were mixed with 8.68 lbs. of lime slaked in 34.3 lbs. of water to produce a mixture having a pH of 8.5 at a temperature of 45° C. After settling and primary decantation, the residual mixture was filtered to produce a clarified liquor filtrate and a filter cake of calcium sulfite sludge of 4.25 lbs. The clarified decanted liquor and filtrate were charged to an autoclave brought up to a temperature of from 300 to 310° F. by steam injection and anhydrous ammonia in amount of 5% by weight of the liquor was charged to the autoclave. Air was continuously bubbled through the autoclave and vented at a rate of 24.2 cubic feet per minute with the autoclave operating at a total pressure of 125 to 150 p. s. i. g. The autoclaving was conducted for a period of 75 minutes at temperature.

The autoclave contents were allowed to partially cool over a period of from 12 to 18 hours, after which the liquor containing a sludge and having a temperature of 150° F. was flashed to atmospheric pressure with further cooling to 50° C. at which point the liquor had a pH of 8.8. The sludge containing liquor was then centrifuged with recovery of 27.1 grams on a dry basis of the sludge (primarily consisting of calcium sulfite). The clarified ammonia treated, and centrifuged liquor (an aliquot in the amount of 889 grams) was acidified with 53 ml. of 24.5% sulfuric acid having a density of 1.174 to a pH of 2.0 with addition of 1.7 grams of thiourea (7% thiourea based on the lignin resin solids as previously determined). The acidified liquor was then heated to the boiling point and held for 5 minutes. The precipitate-containing liquor was then centrifuged to recover the acid precipitated resin intermediate, which was then redissolved in aqueous sodium hydroxide solution having a pH of 9.5. The alkaline solution was dried by tray drying at a temperature of 50° C. to recover the dry thiourea modified stable resin intermediate in the amount of 25 grams (this represents a yield of 35% based on the percent solids in the raw waste sulfite liquor feed).

EXAMPLE 4.—MELAMINE MODIFIED INTERMEDIATE

An ammonia treated autoclave effluent liquor produced in a manner similar to that set out in Example 3 above, was acidified with hydrochloric acid to a pH of 2.5 with prior addition of 11% of melamine based on the weight of lignin resin solids in the liquor as previously determined. The resin intermediate precipitate was filtered from the acid waste liquor and redissolved in 10% NaOH solution to a pH of 9. The redissolved intermediate was recovered in dry powdered form by tray drying at temperatures of 50 to 60° C.

EXAMPLE 5.—UREA MODIFIED INTERMEDIATE

Clarified autoclave effluent liquor (ammonia treated as in Example 3 above) was acidified to pH 1.5 with hydrochloric acid after addition of 20% by weight of urea. The precipitate containing liquor was brought to a boil, filtered and washed. The filtered cake was redissolved in ammoniacal solution of pH 7.3 to 8, reprecipitated by acidification with hydrochloric acid to pH 1.5 and finally washed with large volumes of water to remove residual acid.

EXAMPLE 6.—ANILINE-MODIFIED POTENTIALLY THERMOSETTING LIGNIN RESIN

The following is a typical example, not intended to limit the invention, of the preparation of novolac-type resinous products, and the potentially thermosetting resins derived therefrom. The clarified ammonia treated liquor was then acidified to a pH of 3 by addition of sulfuric acid, the acid precipitated solids being centrifuged from the acid waste liquor. To the resulting acid precipitate sludge, aniline in amount of 5% by weight of precipitated sludge on the dry basis was added together with about 1% formaldehyde. To this mixture hydrochloric acid was added in amount sufficient to reduce the pH to about 1.5, and the aqueous precipitate-containing liquor was heated to the boiling point. The resulting coagulated precipitate was centrifuged, washed, and redissolved in aqueous sodium hydroxide solution at a pH of about 9, and then dried to recover a neutralized primary resin. The dried product was then baked for about 10 hours at 105° C. and then redissloved in water with adjustment of pH to about 9 with sodium hydroxide. To this resulting solution about 5% formaldehyde based on the dry weight of the dissolved solids was added. The plastic solution resulting was refluxed at 100° C. for about 1 hour, and then dried at reduced temperature (50° C.) to produce a highly reactive potentially thermosetting resin capable of being substantially cured at normal drying temperatures in paper manufacture without reducing the production rate. It is sufficiently soluble to be dissolved at the point of use in warm water, and thus is particularly suitable for beater stage addition to paper stock.

EXAMPLE 7.—AROMATIC HYDROXY MODIFIED INTERMEDIATE

Clarified autoclave effluent (ammonia treated waste sulfite liquor) was acidified to a pH of 0.9 to 1.0 after addition of 5% cresol based on the weight of lignin resin solids in the liquor as previously determined. The precipitate-containing acid liquor was brought to a boil and the coagulated resin intermediate precipitate was readily separated by filtration upon cooling. The recovered cake was washed until the filtrate wash water was substantially neutral.

The resin intermediate thus produced is most advantageously employed for formation of a thermosetting glue. It is soluble in acid solutions at pH's down to slightly below 3, and therefore may best be condensed with formaldehyde (or other suitable aldehyde) in aqueous solution in the presence of an acid condensation catalyst at an acid pH of from 3 to 4, whereby a potentially thermosetting resin having a curing time of from 1 to 5 minutes at from 280 to 310° F. is produced.

Applied as a plywood adhesive, this quicksetting glue upon sheer tests produced 90% or more wood failure (prior to adhesive failure), and withstood boiling water tests on plywood joints without serious deterioration.

This resin-forming intermediate modified by aromatic hydroxy compound may also be employed as an impregnating agent, for example, in beater stage addition in paper manufacture. In such a case, it is advantageously dissolved in alkaline solution, preferably ammoniacal, and reacted with appropriate amounts of formaldehyde, as above indicated, to form a potentially thermosetting resin comparable to a phenol-aldehyde in the resole stage. In such application, amounts of the resin approximating 10% by weight based on the weight of the finished paper are recommended.

IMPROVED CELLULOSIC PRODUCTS

One of the principal features of the invention is the provision of low cost, potentially thermosetting resins for impregnation of cellulosic and woody fibrous materials to produce products of increased strength and water-resistance, among which may be mentioned paper, softboard, synthetic lumber, sheetwood, and the like. Among the aforementioned, two of the primary uses of the resinous products of the invention are described in greater detail below.

1. PAPER—"BEATER-STAGE" ADDITION

It has been discovered that the potentially thermosetting resinous products of the invention, particularly those produced by modification with amino group-containing substances, exhibit substantially all of the characteristics which are required for the production of paper of increased strength (particularly dry strength) wherein the resinous impregnating agent is added to dilute paper stock, for example, in the beater stage or machine chest stage of paper production. Among the required characteristics for this purpose possessed by the resins of the invention, the following may be mentioned:

(1) The property of selectively absorbing or adsorbing on the cellulosic fibers so that sufficient amounts of resin to greatly increase dry and/or wet strength (above 10% by weight) may be incorporated with the fibers from an extremely dilute solution of paper stock and resin. In other words, the resins are capable of addition to the paper stock in the beater, stock chest, Jordan engine, headbox or other suitable points ahead of the paper-making wire or screen.

(2) The resin thus incorporated in the fibers may be substantially cured by the heat imparted during the drying stage of paper manufacture, preferably becoming fully cured to a substantially insoluble and infusible state on the finished paper rolls, so that the "broke" (recycled imperfect and end trimmed paper) may be repulped without substantial difficulty.

(3) In connection with the characteristics under (1) and (2) above, the impregnation of the paper stock in the dilute stage followed by drying during paper manufacture must result in sufficient retention of resin on the cellulosic fibers to impart the improved dry and/or wet strength to meet specifications in the finished paper, and must also preferably result in the abovementioned curing without addition of any special equipment and without any material reduction in the ordinary production rate of the paper mill, such as reduction in speed of the drying drums or addition of special curing ovens.

*Resin solution preparation.*—The following may be considered as a recommended manner for preparation of the resin solution for the paper stock treatment, although the invention is not to be deemed specifically limited thereto: 5 grams of the thiourea modified resin intermediate prepared according to Example 3 above, is dissolved in about 180 ml. water, and the pH adjusted to 9, if necessary, with addition of 10% sodium hydroxide aqueous solution. To this solution, 5% (0.25 gram) by weight formaldehyde is added, preferably employing formalin (37% aqueous solution of formaldehyde) with adjustment of pH to 9, if necessary, with addition of 10% sodium hydroxide solution. The total volume of the solution is brought to 200 ml. and refluxed for about ½ hour. The resinous solution thus prepared, is ready for treatment of paper stock.

*Preparation of paper for test and blank sheets.*—For the purpose of comparative tests between resin impregnated paper sheets and unimpregnated sheets, the following procedure was utilized having been accepted by The Institute of Paper Chemistry, Appleton, Wisconsin, as reproductive of conventional paper manufacture.

(1) Pulp preparation: 2 lbs. of "bogus" kraft paper is pulped in approximately 7 gals. of water and heated to the boiling point after which the pulp is allowed to settle and the supernatant liquor is decanted to waste. An additional 7 gals. of water is added to the pulp, the pulp suspension again heated to the boiling point and then allowed to stand for about 8 to 12 hours. Approximately 40 gals. of water is then added to the pulp suspension in a mixing tank, and the diluted suspension is agitated (beaten) so that a blank sheet 1 square foot in area, dried and adjusted to constant moisture content, and prepared from this pulp in the paper making procedure described below, weighs 16.4 grams and has a dry Mullen burst strength of 40 lbs. p. s. i.

(2) Blank sheet: 3250 ml. of the above-mentioned "bogus" kraft pulp is placed in a paper making tank then diluted tenfold and the pH of the suspension adjusted to 5.5 by addition of small amounts of hydrochloric acid. The suspension is stirred and then drained under 27 inches of vacuum for 6 to 8 seconds. The resulting felted product is transferred to a paper press, where it is pressed under a force of 9,000 lbs. for 5 minutes (180 p. s. i.). The sheet is then placed between blotters, 4 dry blotters laminated on the underside of the sheet and 3 dry blotters with a single wet blotter on the top thereof. The sheet is then dried for 20 minutes at 100° C. in a photo-drier and weighed for correction to the standard paper test weight of 16.4 grams per square foot, after which it is humidified for 24 hrs. at 50% relative humidity. The sheet is then ready, as a blank, for dry Mullen burst test.

(3) Resin impregnated test sheet: A typical procedure for preparation of the resin impregnated test sheets is as follows:

3250 ml. of the "bogus" kraft pulp is placed in a paper making tank and diluted tenfold, and 48 ml. of the alkaline solution of resin to provide 1.2 grams of resin (approximately 7% resin based on the weight of the finished paper) is added to the pulp suspension. 5 ml. of a 10% alum solution was added, followed by addition of hydrochloric acid to adjust the pH of the suspension to 3.6. A quantity of 5% solution of sodium meta-aluminate was then added to produce a pH of 5.3 to 5.8. Absorption or adsorption of the resin on the cellulosic fibers of the pulp suspension was indicated by a change in color of the pulp liquor from a definite amber or yellowish shade to a colorless or clear water shade. The pulp suspension was then stirred and drained under 27 inches of vacuum, and the finished test sheet was prepared in a manner identical to that described above for preparation of the blank sheet. Amounts of resin over 10% by weight of the fibers may be introduced into the stock in the foregoing manner, although amounts between 5 and 10% provide excellent results. The following tabulated results may not be obtainable on a standard paper machine, but are obtainable on my "dry belt" attachment to a paper machine as described in my copending application for United States Letters Patent.

*Dry strength.*—Numerous samples of the paper, prepared as described above, both resin impregnated and blank sheets, were subjected to Mullen burst tests to determine comparative dry strengths of the samples. The following results are indicative of the increase in dry strength obtained with the resin impregnated paper, wherein, except as noted below, the dry Mullen burst strength of the resin impregnated sheets is expressed in terms of percentage increase over the 40 p. s. i. dry Mullen burst strength of the standard untreated blank weighing 16.4 grams per square foot.

| Resin | Percent resin added to dilute paper stock based on weight of finished paper | Dry Mullen burst strength, Percentage increase over 40 p. s. i. of standard blank. | |
|---|---|---|---|
| | | Initial | Aged or otherwise treated |
| (1) Melamine modified (11%). | 7 | 59 | 85% (5 weeks' cure at room temp.). |
| (2) Thiourea modified (5%). | 7 | 48 | 50%. |
| (3) Cresol modified (5%). | 10 | 38 | 42%. |
| (4) Unmodified waste sulfite liquor lignin resin of Example 2. | 10 | 80 | 94% (204 p. s. i. compared to virgin kraft blank at 105 p. s. i. after curing of resin impregnated test sheets at 150° C. for ½ hour). |

From the foregoing tabulated results, it may be seen that both the modified and unmodified (self-condensable) resins of the invention provide greatly increased dry strength in paper when added to the dilute paper stock prior to formation of the sheeted or molded product. Such increased dry strength in paper, or other cellulosic products, is a primary feature of the resins of the invention. A comparison with the more expensive beater-stage addition resins of the melamine-aldehyde or urea-aldehyde type will indicate that the dry strength increase produced by these latter resins is relatively insignificant compared with that produced by the resins of the invention, the increased dry Mullen burst strength of the former generally being only about 15% for commercial usage.

*Wet strength.*—It is also an advantage of the invention that a definite increase in wet strength is usually associated with the dry strength increase of the resin impregnated papers. Wet strengths from about 2 to 2½ times that of the blank (7 p. s. i. wet Mullen to 15 to 17 p. s. i. wet Mullen) are generally obtained. With the self-condensable resin (B) of Example 2 utilizing a curing of the resin in the paper at 150° C. for one-half hour (see table above), a wet strength increase of from 4 to 5 times that of the blank has been obtained.

From the foregoing, it is apparent that one of the primary advantages of the resins of the invention is their performance as impregnating agents for sheeted cellulosic products, such as paper, prepared from any type of cellulosic fibrous material, and wherein it is highly desirable to apply the resin to the fiber stock in highly diluted form prior to fabrication of the felted, pressed, or sheeted product.

The resins modified by the addition in the resin recovery process of the amino group-containing substances are particularly advantageous for this application, since their increased cationic activity aids in retention of the resin on the fibers, and results in largely increased dry strength in paper as conventionally prepared in a paper mill without equipment modification or without reduction in production rate. Thus, these particular resins are adaptable for curing at the temperatures to which the paper is subjected in the normal drying operation by passing the paper over heated drums in the usual manner. Full curing of the resins usually occurs on the paper rolls due to the residual heat in the finished paper, or upon aging at room temperature.

On the other hand, excellent results may be obtained with the self-condensable resins of the invention by subjecting the dried paper to a relatively low temperature baking (resin curing) operation for a relatively short perior of time (e. g. 150° C. for one-half hour). Such supplemental curing method for the paper impregnated with self-condensable resins would suitably employ a slowly moving web of the paper passing through an elongated oven provided with heating elements of any suitable type.

In view of the fact that the resins of the invention are dark colored, they are most advantageously utilized with papers such as the unbleached kraft and jute type. The treatment of paper stock by the resins of the invention is accordingly particularly applicable to wrapping paper, paper towels, heavy bag paper, paper liners for boxboard, and any other paper, felted, or sheeted products prepared from cellulosic fibers.

2. UPGRADED SOFTBOARD AND PAPERBOARD

The resins of the invention are also particularly adapted for use as an impregnating agent for sofeboard and paperboard to which they impart highly increased mechanical strength and water resistance.

It has been demonstrated by tests that upgraded softboard (insulating board) of widely varying densities and resin content (from below 5 up to as high as about 30%) may be produced by vacuum impregnation of the untreated board in the wet lap stage, actual impregnation taking place in a few seconds, followed by vacuum drying or utilization of conventional board driers, with or without compression. Thus, the resins as applied to impregnation of softboard (insulating board) may be productive of any one of the following improvements:

(1) Transformation of softboard into a novel board of intermediate density (medium hardboard) of great strength in relation to density, strikingly different from the original softboard product. For example, a softboard ⅜" thick having a density of 0.28 and a dry modulus of rupture of 500 p. s. i. was vacuum impregnated in the wet lap stage with the self-condensable resin of Example 1 above, previously reacted with 5% formaldehyde in ammoniacal solution (hexamethylenetetramine), the solution containing urea as described. The quantity of resin solution employed and the resin concentration thereof produced a 15% by weight resin content in the finished board. After impregnation the board was subjected to vacuum drying followed by flash pressing and a final thermosetting cure of the pressed board for 2 hours at about 170° C. The resulting medium hardboard had a density of .52 and a dry modulus of rupture of 3500 p. s. i. (which when corrected for increase in strength due to compression indicates a dry modulus of rupture increase due solely to the resin content of about 5 times that of the original board). The wet modulus of rupture of the unimpregnated original softboard was negligible, being about 100 p. s. i. The impregnated board with 15% of the resin exhibited a wet modulus or rupture of about 2300 p. s. i., that is, over 60% of the improved dry strength. This may be compared with a wet strength in the unimpregnated softboard of only about 20% based on the dry strength.

The improved board as above produced, is capable of taking nails and screws and will retain paint films with or without previous sanding. It exhibits excellent dimensional stability and in this strength and density range is eminently suitable for numerous structural and decorative applications where more expensive plywood is now employed, wherein the maximum strength of plywood is not required.

(2) An upgraded softboard having highly increased strength and water resistance but without changing its general characteristics. For example, utilizing 15% resin content in the impregnated board, and without compression, followed by passage of the impregnated board through the conventional board drier and subsequent baking for 2 hours at 170° C., softboard having the following properties have been obtained: moduli of rupture of from 1500 to 1890 p. s. i. and densities of .33 to .38. Lesser amounts of resin, probably preferred for upgrading without changing the nature of the board may be used, for example 4 to 10% giving moduli of rupture of from over 750 to about 1050 p. s. i.

Another particularly advantageous application of the resins of the invention, especially the lower cost unmodified or self-condensing type, is as a binder in the manufacture of pressed lumber products, commonly known as "sheet lumber" (sheetwood). These products are known in the trade and industry variously by such names as "fiberboard," "sheetwood" and "presswood," and are generally composed of raw lignocellulosic (wood) fibers admixed with a bonding agent, the mixture being formed into a matted layer or pad, and then consolidated under the action of heat and pressure to produce hard integral sheets of material suitable for use as lumber. In connection with this use of the resins of the invention, methods for the manufacture of such sheet lumber products as fully disclosed in one or more of my following patents may be employed: Patent Numbers 2,480,851; 2,485,587; 2,542,025; 2,550,687; 2,581,652.

In connection with the utilization of the resins in paper impregnation, it should be noted that such resin impregnated paper used in the manufacture of corrugated board liners and corrugating medium permits a reduction in pulp consumption up to about one-half of the normal weight per thousand square feet of finished board, and a corresponding reduction in total cost required to meet a given specification, while at the same time providing greatly increased wet strength or water resistance in the board product. For example, normal boxboard weighing about 150 lbs./1000 sq. ft. and having a nominal dry Mullen test of 250 p. s. i. may be replaced by a finished impregnated board weighing only 98 lbs./1000 sq. ft., by reduction of the liner weight to about one-half (without reduction of the corrugating medium weight) by impregnation of the liners and corrugated medium with about 7% of resin. Such impregnated finished board has the same nominal dry Mullen strength of 250 p. s. i. and represents a saving approximating 25% in cost (allowing for the additional cost of resin impregnation).

Accordingly, the invention provides resins which are generally useful as impregnating agents and binders of the thermosetting type; or as quicksetting adhesives in laminating cellulosic fibrous sheets, and in joining other cellulosic or woody product parts. The resins may also be used as constituents in paints and other finishes.

From the foregoing, it may be seen that the process of the invention provides for the production of valuable resinous products from waste sulfite liquor and other lignosulfonate-containing materials. The resins are of demonstrated high suitability as impregnating agents for upgrading various fibrous cellulosic materials such as softboard and paper, and as such, provide a distinct economic advantage over the more expensive synthetics of the phenolformaldehyde, urea-formaldehyde and malamine-aldehyde types. Further, the process, while providing for the recovery of such thermosetting resinous materials, also effectively converts the residual waste liquor effluent from the process to an industrial waste having substantially reduced oxygen demands (BOD), so that stream pollution and killing of fish by the disposal of such waste liquor is substantially eliminated or greatly diminished.

Although the invention has been described with reference to waste sulfite liquors from the bisulfite pulping process utilizing a calcium base liquor, it should be understood that the process is fully applicable to any waste sulfite liquor regardless of the inorganic base, for example, the liquor may be of the ammonium, alkali metal, magnesium or other alkaline earth metal base type.

Satisfactory results may also be produced, utilizing the essential steps 2 and 3 of the process, as above described, after first having isolated the calcium lignosulfonate compounds from the waste sulfite liquor in a well-known manner. However, it is a distinct advantage of the invention that the resinous products thereof may be obtained without the necessity of such isolation. Also, as above indicated, instead of employing the raw acid waste sulfite liquor, the liquor obtained after first fermenting and distilling a waste sulfite liquor to remove alcohols, produced from the wood sugars by fermentation, may be employed. In such case, the oxidizing conditions used in conjunction with step 2, that is, the ammonia-heat treatment of the liquor, may be partially or completely eliminated.

Still another variation in processing of the liquor to recover the resins should be mentioned here. It has been found that the ash content of the acid precipitated resins and resin intermediates may be substantially reduced by the addition of gaseous sulfur dioxide ($SO_2$) to the autoclave during or after the heat treatment, which procedure is effective to precipitate additional quantities of residual calcium ions as $CaSO_3$. In this way, the resin or resin intermediate obtained upon acid precipitation utilizing sulfuric acid has been found to contain less calcium sulfate, which latter constituted the main source of ash in the recovered products. Reduction of calcium ions to reduce ash content in the resin may also be accomplished by passing carbon dioxide ($CO_2$) gas into the liquor during or after the heat treatment with removal of the calcium carbonate formed. As another alternative, some of the acid waste liquor from precipitation, when sulfuric acid is employed, may be recirculated to the autoclave to remove additional calcium ions as $CaSO_4$, while maintaining the pH of the liquor above the resin or resin intermediate precipitation point.

Also, it is to be understood that where the liquor is subjected to oxidizing conditions in the process, this may be accomplished before the ammonia autoclaving treatment. For instance, oxidizing conditions may be maintained during the liming step, particularly when heating is utilized.

In conjunction with board impregnation, where temperatures on the order of 300° F. or higher are used, it has been found advantageous to add amounts of buffering or alkaline agents with the resin, such as ammonia, urea, dicyandiamid, guanidine and the like. This permits heating the cellulosic material to resin thermosetting temperature without deterioration of the fibers.

The process as hereinabove described, and the resinous products derived thereby may be modified by other operational variations and product properties without departing from the spirit of the invention, the scope of which should be construed by the appended claims.

I claim:
1. The process of producing reactive nitrogen containing compositions from waste sulfite liquor, which is condensable with aldehydes to form potentially thermosetting resins, comprising heating the liquor in the presence of ammonia to impart a substantial nitrogen content to the acid-precipitatable component thereof, and acidifying the liquor to precipitate and recover said nitrogen-containing compositions.

2. Reactive nitrogen containing compositions comprising the acid precipitated condensation products of ammonia with waste sulfite liquor said compositions being capable of condensation with aldehydes to potentially thermosetting resins.

3. The process of treating waste sulfite liquor to produce reactive nitrogen containing compositions capable of condensation with reactive aldehydes to form potentially thermosetting resins which comprises removing inorganically combined sulfur from the liquor with addition of lime, heating the liquor at from about 275 to 350° F. in the presence of ammonia and an oxygen containing gas for a time sufficient to impart a substantial nitrogen content to the acid precipitatable components thereof, and acidifying the ammonia treated liquor to a pH not exceeding about 3 to precipitate and recover said nitrogen containing compositions.

4. Potentially thermosetting resinous compositions comprising in major part the acid precipitated condensation products of ammonia and lignosulfonate and lignosulfonate derivatives of substantially inorganic sulfur free waste sulfite liquor reacted with a minor amount of a reactive aldehyde, said compositions containing amounts of nitrogen in excess of 3%.

5. A process for the treatment of waste sulfite liquor to produce reactive nitrogen containing compositions capable of condensation with aldehydes to potentially thermosetting resins, which comprises adding lime to the liquor to a pH of from about 7 to 9 to precipitate calcium sulfite, pressure cooking the liquor in the presence of at least about 3% ammonia by weight of the liquor and an oxygen containing gas at a temperature of from about 290 to about 310° F. and at a pH of from about 9 to 11 for from about one half to two hours, recovering a predominant portion of the ammonia, acidifying the liquor to a pH not exceeding 3 to obtain a precipitate, maintaining the precipitate-containing liquor at an elevated temperature up to its atmospheric boiling point, and separating the reactive-nitrogen containing precipitate from the liquor.

6. Paper comprising cellulosic fibers and a minor amount of a heat cured resin comprising the acid precipitated nitrogen-containing reaction products of ammonia with substantially inorganic sulfur free waste sulfite liquor, said paper having a substantially increased dry strength compared to paper of the same basis weight containing no resin, said resin being present on the fibers as obtained by adsorption from a dilute aqueous suspension of the fibers.

7. A method of preparing resin containing paper of substantially increased dry strength compared to paper of the same basis weight containing no resin, which comprises adding to a dilute aqueous suspension of cellulosic fibers a minor amount of an alkaline solution of a potentially thermosetting resinous composition comprising the acid precipitated reaction products of ammonia and substantially inorganic sulfur free waste sulfite liquor, adjusting the pH of the mixture to from about 5 to 6 to adsorb the resin on the fibers, then forming the resin-containing fibers into paper, drying the paper, and curing the resin.

8. A heat cured resin impregnated cellulosic fiber board having a substantially increased dry and wet modulus of rupture compared to an unimpregnated board of comparable fiber content and density comprising consolidated cellulosic fibers with which is incorporated a minor amount of a thermoset resin comprising the heat cured condensation products of a minor amount of a reactive aldehyde with the acid precipitated reaction products of ammonia and substantially inorganic sulfur free waste sulfite liquor.

9. A synthetic lumber product comprising heat and pressure consolidated wood fibers incorporating a minor amount of a thermoset resin binder comprising the condensation products of a minor amount of a reactive aldehyde with the acid precipitated reaction products of ammonia with the lignosulfonate and lignosulfonate derivatives of substantially inorganic sulfur free waste sulfite liquor.

10. Acid precipitated, reactive-nitrogen-containing compositions capable of condensation with reactive aldehydes to yield potentially thermosetting resins, comprising at least in major part the acid-insoluble condensation product of ammonia and a material selected from the group consisting of lignosulfonate and lignosulfonate derivatives, said composition being substantially free of inorganic sulfur and containing about 3 to 5% nitrogen.

References Cited in the file of this patent

UNITED STATES PATENTS

| | | | |
|---|---|---|---|
| 478,229 | Frank | July 5, | 1892 |
| 757,337 | Nettl | Apr. 12, | 1904 |
| 1,160,362 | Baekeland | Nov. 16, | 1915 |
| 1,899,526 | Phillipps | Feb. 28, | 1933 |
| 2,159,411 | Wallace | May 23, | 1939 |
| 2,184,622 | Mauthe et al. | Dec. 26, | 1939 |
| 2,191,737 | Alles | Feb. 27, | 1940 |
| 2,205,355 | Grimm | June 18, | 1940 |
| 2,228,567 | John | Jan. 14, | 1941 |
| 2,266,265 | Rieche | Dec. 16, | 1941 |
| 2,286,643 | Phillips et al. | June 16, | 1942 |
| 2,338,602 | Schur | Jan. 4, | 1944 |
| 2,365,599 | Schirm | Dec. 19, | 1944 |
| 2,491,832 | Salvesen | Dec. 20, | 1949 |

FOREIGN PATENTS

| | | | |
|---|---|---|---|
| 202,016 | Great Britain | Aug. 8, | 1923 |
| 982,100 | France | June 4, | 1951 |